June 1, 1954 — W. E. BROWNELL — 2,679,691
SHRUB TRIMMING GUIDE
Filed Jan. 23, 1950
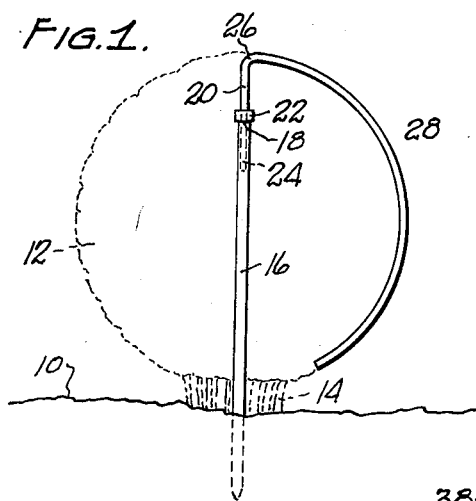
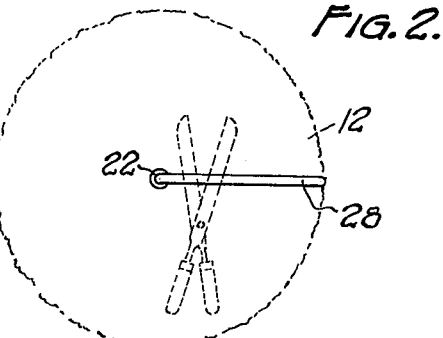
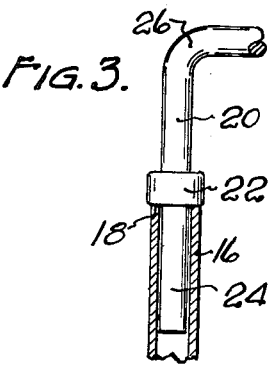
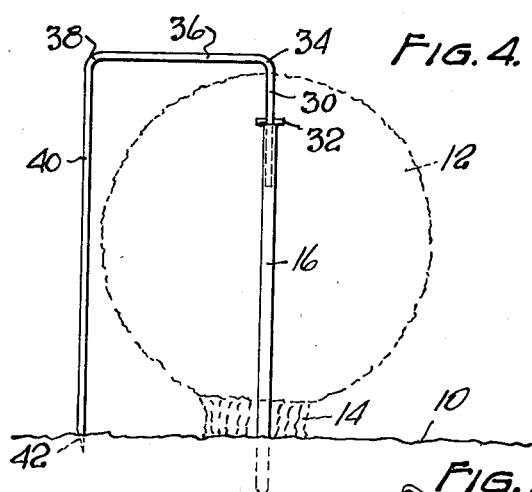
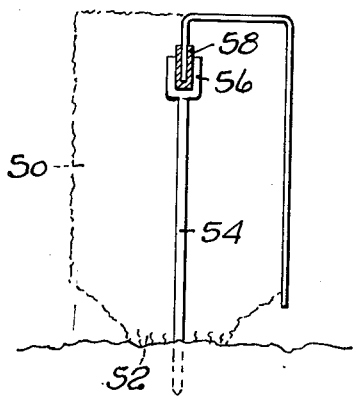
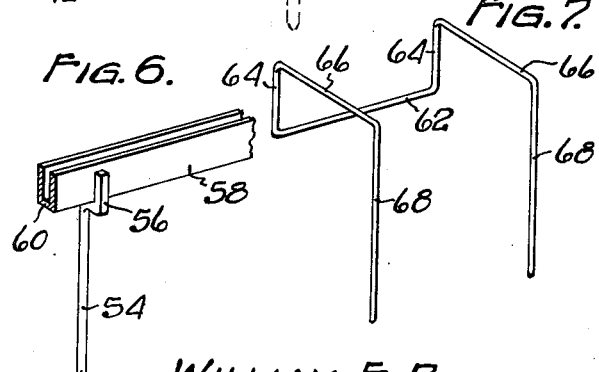
WILLIAM E. BROWNELL.
INVENTOR.
BY Oltsch + Knoblock
ATTORNEYS.

Patented June 1, 1954

2,679,691

UNITED STATES PATENT OFFICE 2,679,691

SHRUB TRIMMING GUIDE

William E. Brownell, South Bend, Ind.

Application January 23, 1950, Serial No. 139,985

2 Claims. (Cl. 33—174)

This invention relates to improvements in shrub trimming guides by means of which a shrub may be trimmed to a predetermined size and shape uniformly upon each trimming thereof.

The primary object of the invention is to provide a device of simple, inexpensive character, which is easy to apply and to use, which does not require special talent or skill in its use, which accommodates rapid and accurate trimming of a shrub to a predetermined attractive and ornamental shape and whose repeated use stimulates growth of the shrub to fill in the predetermined shape substantially uniformly.

A further object is to provide a device of this character which has a standard which is mounted permanently in the ground in fixed relation to the shrub, and a movable guide which is mounted removably upon the standard, said standard being positioned in concealed location but being readily accessible for use when desired.

A further object is to provide a device of this character which can be used to accurately trim a shrub growing on a hillside or a terrace; and which can be used on shrubs with multiple stems as well as those with a single stem.

Other objects will be apparent from the following specification.

In the drawing:

Fig. 1 is a side view illustrating one embodiment of my invention, with a shrub illustrated in dotted lines.

Fig. 2 is a top plan view of my invention illustrating a shrub in dotted lines.

Fig. 3 is an enlarged fragmentary axial sectional view illustrating the connection between the standard and the guide member in the embodiment illustrated in Figs. 1 and 2.

Fig. 4 is a side view illustrating a modified embodiment of the invention usable for the purpose of guiding the trimming of sod around a shrub.

Fig. 5 is an end view of a modified embodiment of the invention adapted for use in the trimming of hedges or elongated bushes or shrubs, illustrating in dotted lines the outline of the hedge or shrub.

Fig. 6 is a fragmentary perspective view of a stationary guide of the embodiment illustrated in Fig. 5.

Fig. 7 is a perspective view of the slidable trimming guide utilized in the embodiment illustrated in Fig. 5.

Referring to the drawing which illustrates the preferred embodiment of the invention, and particularly to Figs. 1 to 3, inclusive, the numeral 10 designates the level of the ground in which a shrub 12 is growing, said shrub having stems or stalks 14. My shrub trimming guide comprises a rigid tubular standard 16 which is positioned upright centrally of the shrub and is driven into the ground centrally among multiple stalks 14 or adjacent and alongside a single stem or stalk. The tubular member 16 is driven into the ground to a sufficient depth to insure that the tube will maintain its proper position. The tube is of such a length that its upper end 18 terminates spaced below the height to which the shrub is to be trimmed, said top end preferably being positioned at least two or three inches below the top of the shrub.

A rigid trimming guide is adapted to be mounted removably and rotatably in the tubular standard 16. The trimming guide preferably comprises a shank portion 20 which is substantially straight and which has fixedly secured thereto intermediate its length a sleeve, collar or other abutment member 22. As here shown, the member 22 encircles the rod 20 but the abutment may take any form desired and, for example, may constitute a cross-pin. The terminal portion 24 of the shank between the free end of the shank and the abutment 22 will be straight and will be of a size to fit snugly and rotatably within the tubular standard 16. The length of this shank portion 24 will preferably be sufficient to insure against excessive play or tilting of the shank within the tube and at the same time will preferably be short compared to the total length of the tube, so that said shank will bear substantially the relation illustrated in Fig. 1, insofar as its length, compared to the length of the tube, is concerned. The guide element is preferably formed from rigid bar or rod stock, preferably of circular cross-section, although it may be formed of tubular stock or non-circular cross-section if desired.

The shank 20 extends above the abutment 22 and the upper end of the tubular standard 16 to a level coinciding with the level at which the top of the shrub is to be trimmed, and is there bent at 26. The remaining portion 28 of the guide is bent to desired configuration. As here illustrated, the portion 28 is of arcuate shape; however, that portion may assume any shape desired, the shape being selected according to the shape which it is desired the shrub 14 will assume when trimmed. Thus the member 28 might be of non-arcuate curved form, or a form including combinations of straight and curved portions, or the like. The length of the guide portion 28 will preferably be such that when the shank portion 24 is received within the standard 16 and the abutment 22 bears against the upper end 18 of the standard, the lower outer end of the part 28 will be spaced above ground level.

In the use of the device, assuming that the tubular standard 16 has been positioned as desired, the user inserts the shank portion 24 into the upper end of the tube and causes the abutment 22 to bear against the upper end 18 of the standard 16. The curved portion 28 of the guide will then assume a position with respect to the shrub as illustrated in Fig. 1, with the exception that, assuming that the shrub requires trimming, the outlines of the shrub will project beyond the trim guide portion 28. The trimming operation can then be commenced by cutting the shrub adjacent to the guide 28 at a tangent thereto, making all cuts necessary to trim the shrub for the full length of the portion 28. Thereupon the guide 28 is rotated through a small angle about the axis of the standard 16 and another series of tangential cuts are then made along the length of the member 28. These operations continue with progressive trimming of the shrub until the trimming operation has been completed. The removable guide unit 20—28 can then be removed and placed in a standard 16 at another shrub, if desired.

I have found in the use of this device that, after the initial trimming to desired shape had occurred, subsequent growth of the shrub tends to fill out the shrub at the outer trimmed periphery or outline thereof and that after several trimming operations the shrub will have a substantially uniform growth throughout its trimmed surface, that is, the thickness of the growth of the shrub branches will be uniform and the occurrence of bare or empty places within the trimmed outline of the shrub will be avoided. This facilitates the complete concealment of the standard 16. At the same time the character of the shrub with its branches facilitates the easy insertion and removal of the guide portion 20—28 by separating the branches or the leaves of the shrub. It will be apparent that this device forms a guide which facilitates trimming of the shrub rapidly to the exact size and shape desired by means which can be handled or manipulated rapidly and expeditiously.

In the event it is desired to cut away sod around a shrub in a desired centered relation, the arrangement illustrated in Fig. 4 may be employed. In this embodiment of the invention the upright tubular standard 16, which has been described previously, will be used as the mounting for a removable guide unit having a shank portion 30 having a rotatable telescoping fit within the tubular upright and having an abutment 32 intermediate the ends of the shank portion 30. The guide is formed of rigid material, such as bar stock or tube stock, and its shank preferably extends upwardly above the level of the top of the shrub 12 where it is bent at 34. A run 36 extends from the bend 34 laterally of the shrub and at a point thereabove to a bend 38 from which the unit extends downwardly in a rigid portion 40. The lower end of the shank 40 is tapered or sharpened at 42 so that it is adapted to penetrate sod. If desired, the portion 42 may be in the nature of a blade wider than the member 40 and positioned parallel to the part 40 but perpendicular to the plane in which the parts 30, 36, 40 lie. The length of the part 40 is such that the part 42 will pierce the sod when the shank 30 is fitted within the tubular standard 16 with the abutment 32 bearing against the upper end of that standard.

In the use of this embodiment of the invention, the sharpened part or spade portion 42 of the member 40 is inserted into the sod to cut the same at one rotative position of the device, then raised, rotated through a small angle and again lowered to cut the sod, which operation continues until a complete circular outline of cuts in the sod is formed which will guide the user subsequently in the use of a hand spade to complete the sod trimming and turning operation.

It will be understood further that while the embodiment illustrated in Fig. 4 is preferred for the sod trimming operation, it is illustrative and may assume other shapes and forms. Thus one possible alternative which may be utilized is to provide one rotatable guide member which will serve the purpose both of guiding the trim of the shrub and in guiding the cutting of the sod. In such instances, instead of the parts 36 and 40 being positioned clear of the outline of the shrub, they will be of such shape and dimension as to conform at their upper parts above the cutting portion 42 to the shape into which the shrub is to be trimmed. This arrangement may necessitate the further bending or shaping of the outer part to position the sod cutter 42 at the desired spaced relation to the center of the shrub.

The invention is also applicable for use in guiding the trimming of hedges, such as privet hedges or elongated shrubs. An embodiment of the invention which accommodates such usage is illustrated in Figs. 5, 6 and 7. The hedge is here illustrated in dotted lines at 50 and has stems or stalks 52. At spaced intervals along the length of the hedge and centrally thereof are positioned rigid uprights 54, such as stakes, tubes or rods, which are driven into the ground and permanently positioned with their upper ends spaced below the top surface of the hedge. Each stake 54 preferably has a forked upper end 56, and these forks at spaced intervals embrace elongated rigid U-shaped horizontal members 58, preferably formed of metal and having the upper edge thereof spaced several inches below the level of the top of the hedge. The part 58 is preferably U-shaped as shown, having elongated upright side walls and a bottom wall 60 which is preferably apertured at spaced intervals therealong so as to facilitate the drainage from the unit 58 of water which might otherwise be collected and retained therein. The guide unit employed for use in the hedge is preferably of the character shown in Figs. 5-7, and is formed of rigid bar or tube stock whose cross-sectional dimension is preferably such as to have a snug but free sliding fit within the interior of the U-shaped member 58. As best seen in Fig. 7, the removable guide unit has an elongated, straight, central portion 62 which is adapted to bear flat against the base 60 of the channel 58. Upright arm portions 64 are bent from the opposite ends of the portion 62, being of a level such that when the part 62 bears against the bottom 60 of the channel 58, the upper ends of said upright arms 64 will extend to the level at which it is desired to trim the top of the hedge. Lateral arms 66 extend from the upper ends of the uprights 64, which are here shown as straight, and horizontally positioned but which may be curved or positioned at an inclination, if desired. The parts 66 serve as guides for trimming the top surface of the hedge.

Depending arm portions 68 are bent downwardly from the portion 66 in spaced relation to the part 64 a distance equal to one-half the desired width or thickness of the hedge 50. These arms 68 may be curved and may be so positioned with respect to the parts 66 that the desired contour or shaping of the top and sides of the shrub will be provided or outlined thereby.

In the use of this embodiment of the invention the unit 62—68 is mounted in the channel 58 as illustrated in Fig. 5 and the shrub is trimmed by the user, using the portion 66, 68 as a guide. As each portion along the length of the shrub at one side thereof is trimmed, the unit 62—68 is advanced and the trimming operation continues until the entire hedge at one side thereof is trimmed. Thereupon the guide 62—68 is turned so that it extends along the other side of the hedge. For example, as seen in Fig. 5, the guide will be reversed to extend to the left of the hedge 50 instead of to the right thereof, as illustrated in said figure. The previous trimming operation is then repeated along the full length of the hedge, whereupon a fully symmetrical and uniformly dimensioned hedge will be obtained.

While the telescopic interfit of the parts of the embodiments illustrated in Figs. 1 and 4 is preferred, and the relation of the parts in the embodiment illustrated in Figs. 5 to 7, wherein the removable slidable guide has a fit within a stationary channel, are both preferred, it will be understood that the parts may be transposed as by providing sockets upon the shanks of the removable and shiftable guide members of each embodiment which fit around the stationary standards or guides.

While the preferred embodiments of the invention have been described and illustrated herein, it will be understood that changes may be made in the construction within the scope of the appended claims without departing from the spirit of the invention.

I claim:
1. A landscape trim guide, comprising a rigid post member adapted to be driven into the ground in the center of a shrub with its upper end spaced below the top of the shrub, a rigid configured member having a substantially upright end portion, one of said members constituting a tube telescopically and removably receiving the other member, and an abutment carried by one of the telescoped members spaced from its end and engaged by the other telescoped member, said configured member projecting laterally outwardly from said end portion and including a lower end portion extending laterally inwardly toward and terminating spaced from said post.

2. A landscape trim guide, comprising a rigid post member adapted to be driven into the ground in the center of a shrub with its upper end spaced below the top of the shrub, a rigid configured member having a substantially upright end portion and a configured guide portion, said inner end portion having a detachable rotatable interfitting engagement with said post member, the configured guide portion extending laterally from said end portion and having a downturned part of elongated vertical dimension and terminating at its lower outer end portion in a sod-penetrating sharp end portion.

References Cited in the file of this patent

UNITED STATES PATENTS

| Number | Name | Date |
| --- | --- | --- |
| 223,372 | Miner | Jan. 6, 1880 |
| 674,161 | Brown | May 14, 1901 |
| 975,057 | Meeks | Nov. 8, 1910 |
| 1,452,640 | Hulick | Apr. 24, 1923 |
| 1,460,093 | Costovici | June 26, 1923 |
| 1,627,258 | Sullivan | May 3, 1927 |
| 2,074,062 | Newman | Mar. 16, 1937 |
| 2,212,430 | Zimmerman | Aug. 20, 1940 |
| 2,313,115 | Allen | Mar. 9, 1943 |
| 2,478,081 | Beets | Aug. 2, 1949 |
| 2,494,160 | Biharry | Jan. 10, 1950 |
| 2,535,722 | Cooke | Dec. 26, 1950 |
| 2,538,118 | Miller | Jan. 16, 1951 |